United States Patent [19]

Raub

[11] Patent Number: 4,924,770
[45] Date of Patent: May 15, 1990

[54] PORTABLE, AUTOMATIC JUICE EXTRACTION MACHINE

[75] Inventor: John R. Raub, San Marcos, Calif.
[73] Assignee: Juice Tree, Garden Grove, Calif.
[21] Appl. No.: 347,987
[22] Filed: May 5, 1989
[51] Int. Cl.$^5$ .............................................. A23N 1/00
[52] U.S. Cl. ........................................ 99/511; 99/510; 99/513; 494/43
[58] Field of Search ...................... 99/495, 509–513; 494/43, 56; 100/116, 121, 130, 108, 133–135

[56] References Cited

U.S. PATENT DOCUMENTS

| | | | |
|---|---|---|---|
| 2,274,020 | 2/1942 | Weightman et al. | 99/509 X |
| 2,481,848 | 9/1949 | Lapps | 99/511 |
| 4,088,070 | 5/1978 | Montagroni et al. | 100/121 |
| 4,095,517 | 6/1978 | Janovtchik | 99/495 |
| 4,154,163 | 5/1979 | Niemann | 100/108 |
| 4,522,119 | 6/1985 | Finch et al. | 99/513 |

Primary Examiner—Timothy F. Simone
Attorney, Agent, or Firm—John J. Murphey

[57] ABSTRACT

A portable, automatic juice-extraction machine comprising a cabinet on which is mounted a hopper for loading with the juice source material, such as apples, pears and the like, a conveyor belt to transport the material from the bottom opening of the hopper into a loading chute for dropping into a grinder, where the material is ground into pieces and then dropped by gravity into a centrifuge where the pieces are further ground into a pulp for action by centrifugal forces to separate the juice from the pulp and transmit the juice into a holding tank for dispensing and the waste material into a garbage bag where the improvements include offsetting the loading chute into a slanted transition chute, to prevent blowback of the ground material, and a pair of spaced-apart projections directed outward from the top of the centrifuge bowl into a slanted area formed in the centrifuge lid to upset the cake buildup of the waste material thus allowing the material flung from the top of the centrifuge bowl to carry the cake into the waste receptacle and render the machine self-purging.

21 Claims, 8 Drawing Sheets

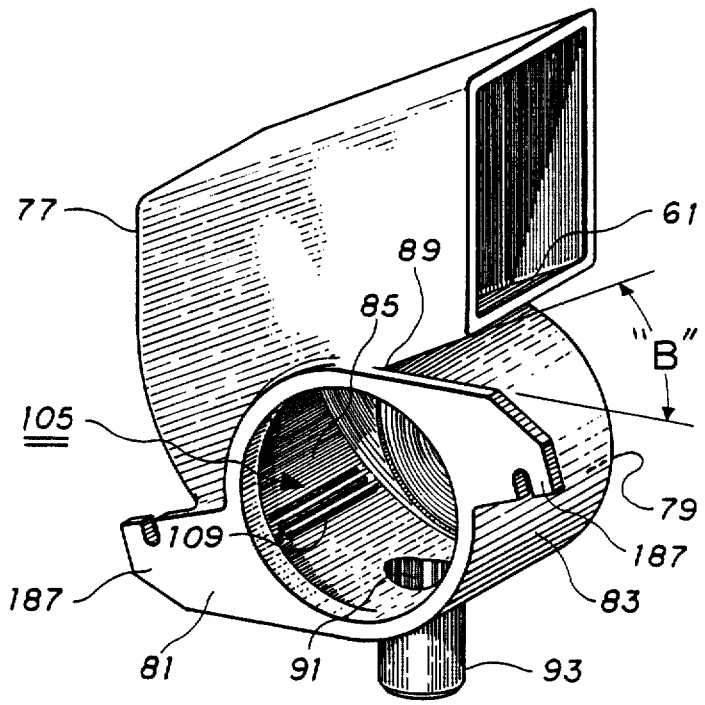
FIG. 6
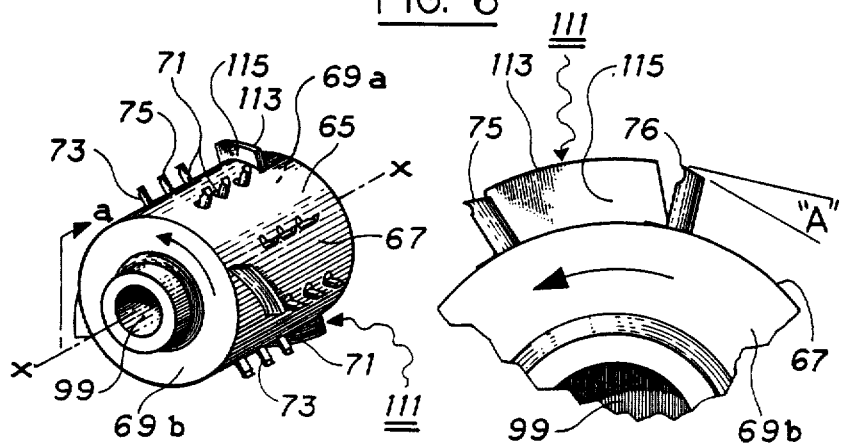
FIG. 7
FIG. 7a

PORTABLE, AUTOMATIC JUICE EXTRACTION MACHINE

BACKGROUND OF THE INVENTION

1. Field of the Invention

This invention pertains to the field of juice extraction devices. More particularly, this invention pertains to a midsized, portable machine, usable in stores and supermarkets, for extracting juice from a variety of fruits and vegetables, in full view of the customer to insure freshness and maximize impulse sales by presenting a fascinating display of automation for the store customers.

1. Description of the Prior Art

As the public receives more information from research in cancer, heart disease and other maladies, there is a growing awareness of the need for proper dieting and for refraining from ingesting man-made chemicals such as dyes and preservatives. Such awareness has created pressure on food suppliers to provide more freshness in fruits and vegetables. While visual observation and slight handling can determine freshness, little can be determined about the content of chemicals used to color and preserve the product.

In the area of fruit juices, there is a growing reluctance to purchase bulk quantities of juices for fear the color and shelf-life have been stabilized by the addition of unwanted dyes and preservatives. Accordingly, freshness is now in vogue and attention is now given to making the juice within full view of the customer. To see it squeezed is to know it is fresh.

In the same respect in this day of enlightened attitudes of health consciousness, there is an increasing demand for juices extracted from various fruits and vegetables. In many instances, juices from fruits such as apples and pears, as well as vegetables such as celery and carrots, enjoy a vigorous market. Where possible, a machine to extract these juices from fruits and vegetables could compliment other fresh-squeezed juices to enhance the attraction of customers to the supermarket.

Juice extracting devices historically have come in two sizes, (1) extremely large, for processing tons of fruits and vegetables utilizing at least one, but usually, many workers, and (2) very small, home-use sized units for processing a few pieces—up to a pound or so—for one person. The large presses are housed in their own factories and are profitable because the investment in machinery and labor is spread over thousands of gallons of salable juices. The small, home-use size is very labor-intensive and the home owner uses only fresh fruits and vegetables as a starting material.

For a store selling a variety of fruits and vegetables, and juices therefrom, the amount of juice would not justify the large cost of transportation to a large processing plant and the small, home-use size is too labor intensive to make the operation profitable. In addition, any machine that could be used in such a store must have certain other characteristics to make it appealable to the store owner as well as to the customer.

First, it must be portable so that it can be easily moved about the store to areas of desired use, to different areas of produce display, and to the produce preparation area for daily cleaning. Second, it should be no higher than eye-level so customers can observe the operation from start to finish and so that it can be moved through doorways, from one place to another. Health-conscious persons who are the main bulk of purchasers of juice are suspicious of things they cannot see. Accordingly, it is desired that they can observe the whole operation of the process, from loading the hopper with a certain fruit or vegetable to the accumulation of juice in the holding tank.

Third, it should be self-purging so as to be spatter-free for customer appeal. Fourth, it should be automatic to eliminate the cost of a full-time attendant. Fifth, it should be easily cleanable to reduce the cost of the part-time labor actually needed to load the unit. Sixth, it should be of strong, durable construction to withstand rough handling and, very importantly, use single-phase electricity to enable its use in the produce departments of existing supermarkets and stores without the necessity of long, potentially dangerous, extension cords stretched from two or three-phase sources.

SUMMARY OF THE INVENTION

This invention is a portable, automatic juice-extraction machine for specific use in stores and super markets that overcomes all the aforesaid problems of the prior art as well as satisfies the many requirements set out above. The machine is usable with a wide range of vegetables and fruits as well as with a significant range of specialty vegetables and fruit that may be desired by customers for their juice only. It is of rugged construction, uses single-phase current, is no higher than eye level, and has automatic, self-purging features heretofore not found in the prior art. Its use will improve profits to store owners as well as increase their potential customer base. The unit is completely portable, is self-purging and presents customers with a wide variety of juices from which they can purchase without using their own, labor intensive devices.

These features are accomplished by providing a sturdy cabinet mounted on wheels on which is mounted, no higher than eye level, a hopper for loading with the source material, a conveyer, a unique cutter that does not splash product but directs the cuttings and liberated juice in a narrow stream to the bottom of a continuous centrifuge to extract the juices for transport to a holding tank and that directs the spent material in a continuous, self-purging stream into a container within the cabinet for later discard. Such a machine does not exist in the prior art and its invention provides the public with a means of obtaining valuable juices from a variety of fruits and vegetables.

Accordingly, the main object of this invention is a portable, automatic juice extraction machine for extracting juice from fruits and vegetables in supermarkets and produce stores. Other objects include a machine for extracting juice from produce that does not require the attendance of full-time labor, is amenable to extracting juice from a wide assortment of fruits and vegetables, is self-purging and otherwise constructed to pass the material through the machine without spattering incoming material and distributes the juice into a convenient holding tank and the waste material into a container for easy disposal. Still other objects of the invention include a machine easily adapted for use with other types of produce, easily disassembled for cleaning and controlled by electronic means to be safe and to operate on single-phase alternating current.

These and other objects of the invention may be seen by a careful reading of the Description of the Preferred Embodiment taken with the Drawings appended hereto. The scope of invention sought by the inventor may be gleaned from a fair reading of the claims that conclude this specification.

DESCRIPTION OF THE DRAWINGS

FIG. 6 is an illustrative view of the transition chute passing into the cutter housing showing the location and configuration of the means provided to prevent the source material from spinning above the cutter;

FIG. 7 is a close-up view of the cutter drum showing the manner of achieving a reduction in size of the source material and the means used to direct the cuttings into a narrow discharge stream central of the cutter drum;

FIG. 7a is a close-up side elevational view of the cutter drum showing the angle of the distal end of the cutting tooth;

DESCRIPTION OF THE PREFERRED EMBODIMENT

Figure 1:
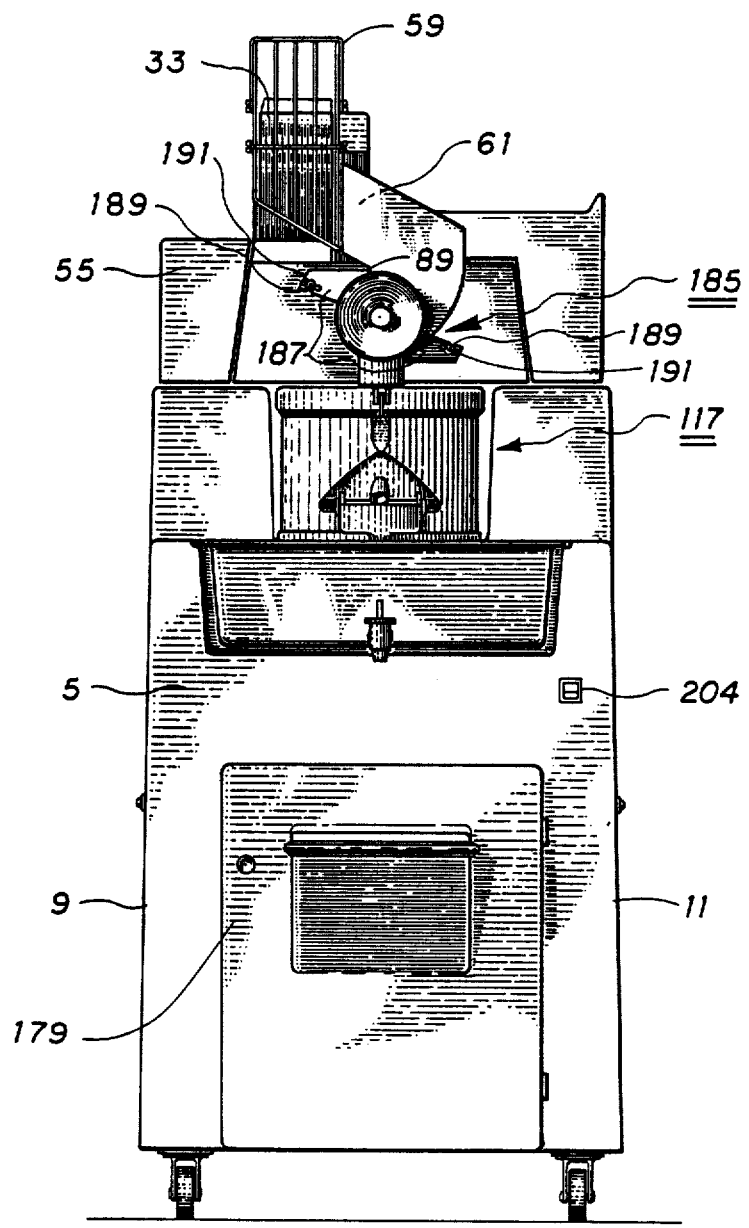
FIG. 1 is a front elevational plan view of the preferred embodiment of this invention.
Figure 2:
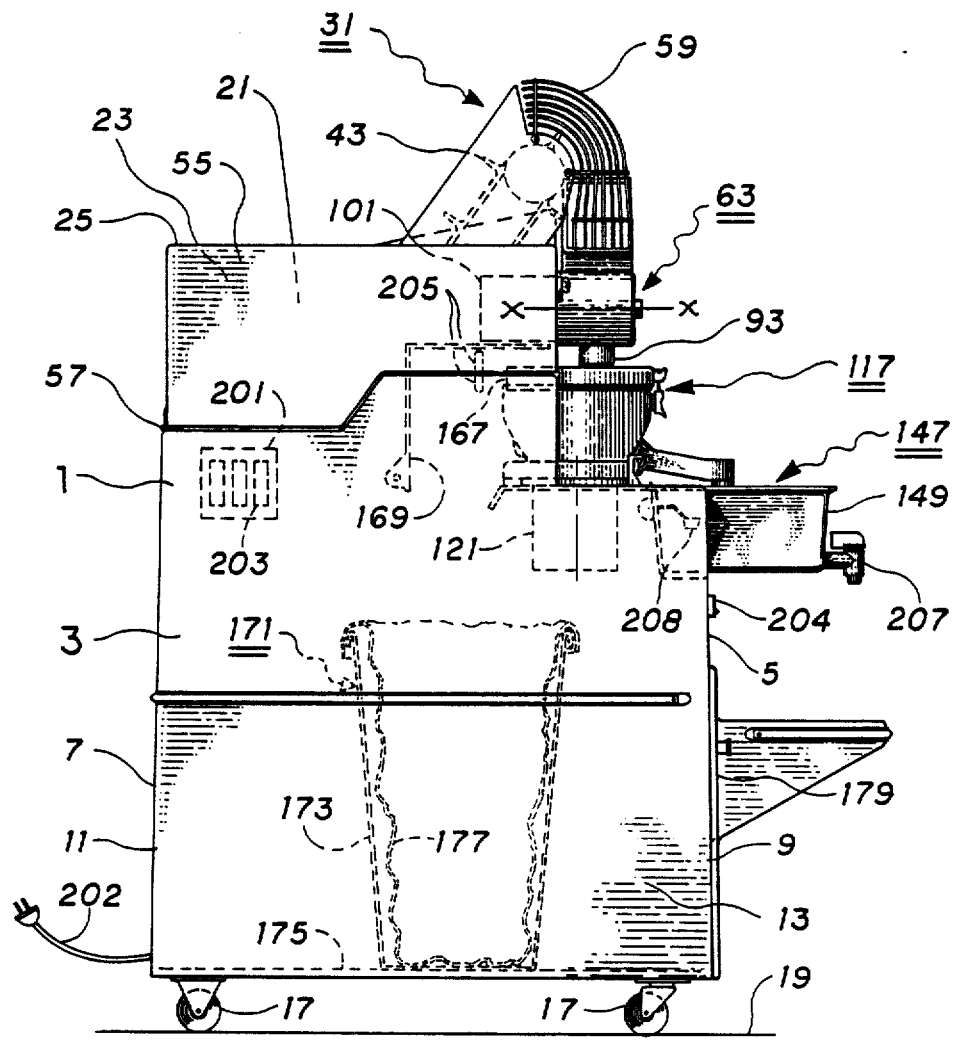
FIG. 2 is a side elevational plan view of the embodiment shown in FIG. 1.
Figure 3:
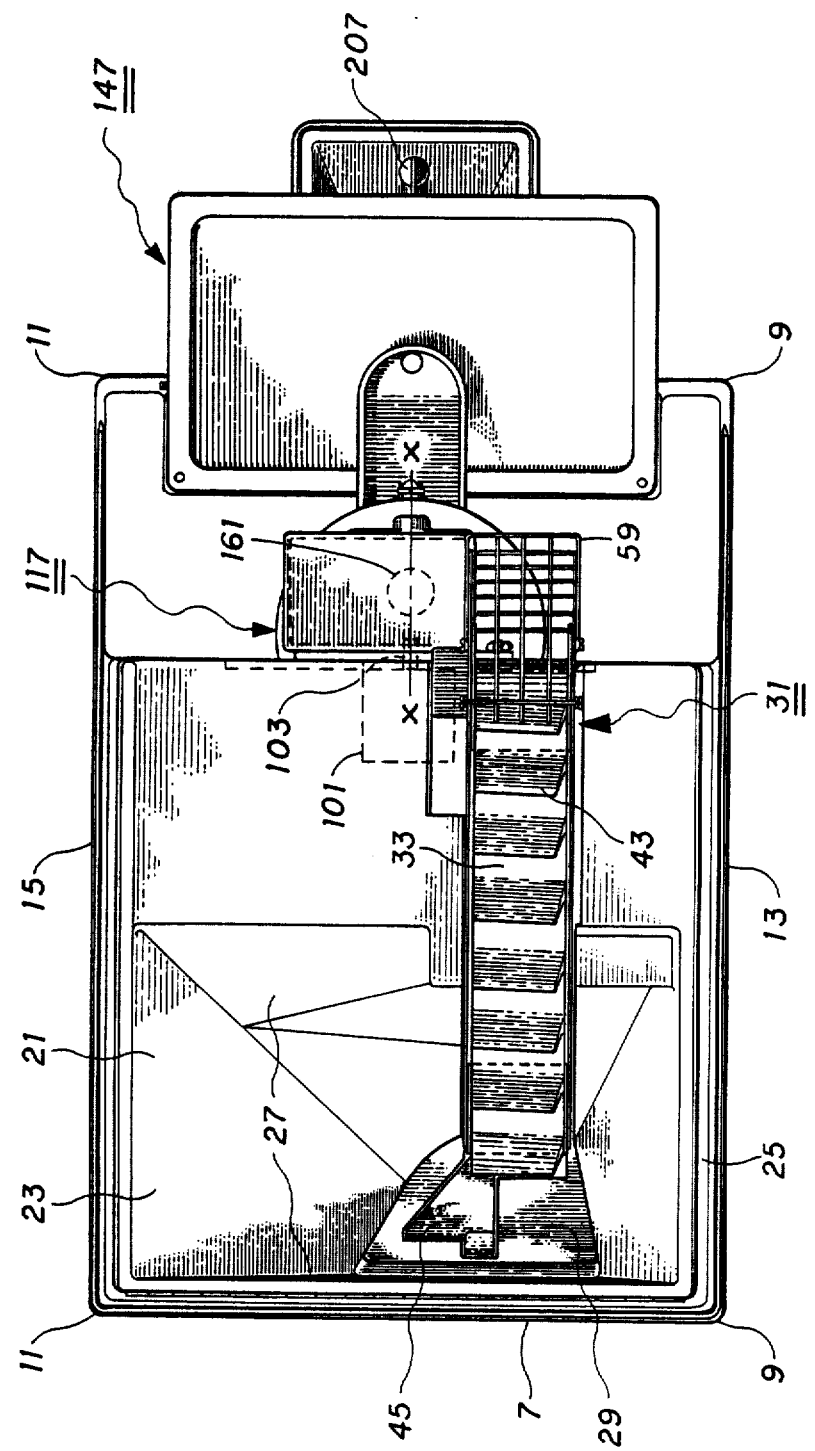
FIG. 3 is a top plan view of the embodiment shown in FIG. 1.

Turning now to the drawings, where like elements are identified by like numerals throughout the 13 figures, the machine of this invention is shown in overall appearance in FIGS. 1-3. In the following specification the terms "source" and "source material" will be used to generically identify the fruits and vegetables that ma be loaded in the machine for the juice to be extracted therefrom. As stated earlier, this source may include apples, pears and other fruit such as peeled bananas, topped and peeled pineapples, pitted peaches, etc. In fruit normally carrying a head or tassel, like pineapple, the skin and/or tassel should first be removed. In pineapples, the skin, core and top may be conveniently removed with the use of my previously patented invention titled "Pineapple Peeler", Ser. No. 07/113,211, soon to be issued.

With respect to vegetables, the term "source" is also generically applied. Tassels, such as the green tops of carrots, should be removed before charging them to the machine. Also, all large, hard pits should be removed prior to charging. As will be described later, most vegetables can have their juices readily extracted by this machine by charging the source material directly to the centrifuge.

The machine of this invention is generally indicated at 1 and shows it to be comprised of a cabinet 3 generally defined by spaced-apart front and rear panels 5 and 7 respectively, in vertical orientation and joined along their respective side edges 9 and 11 by a pair of spaced-apart side panels 13 and 15. Cabinet 3 is mounted on a set of rollers or wheels 17 for moving the cabinet across a floor 19 or other level surface.

A hopper 21 is provided and supported on cabinet 3 and has a large open top loading area 23 defined by an upper edge 25 into which source material may be dumped for processing. It is important that upper hopper edge 25 be no higher than eye-level of the average customer, or between about 5 feet and 6 feet above floor 19, so that customers may see the source material that is dumped therein. Hopper 21 is further defined by spaced-apart side walls 27 that angle inward towards each other as they extend downward toward hopper bottom opening 29. Gravity will cause any source material charged into hopper 21 to press downward toward hopper bottom opening 29.

Figure 4:
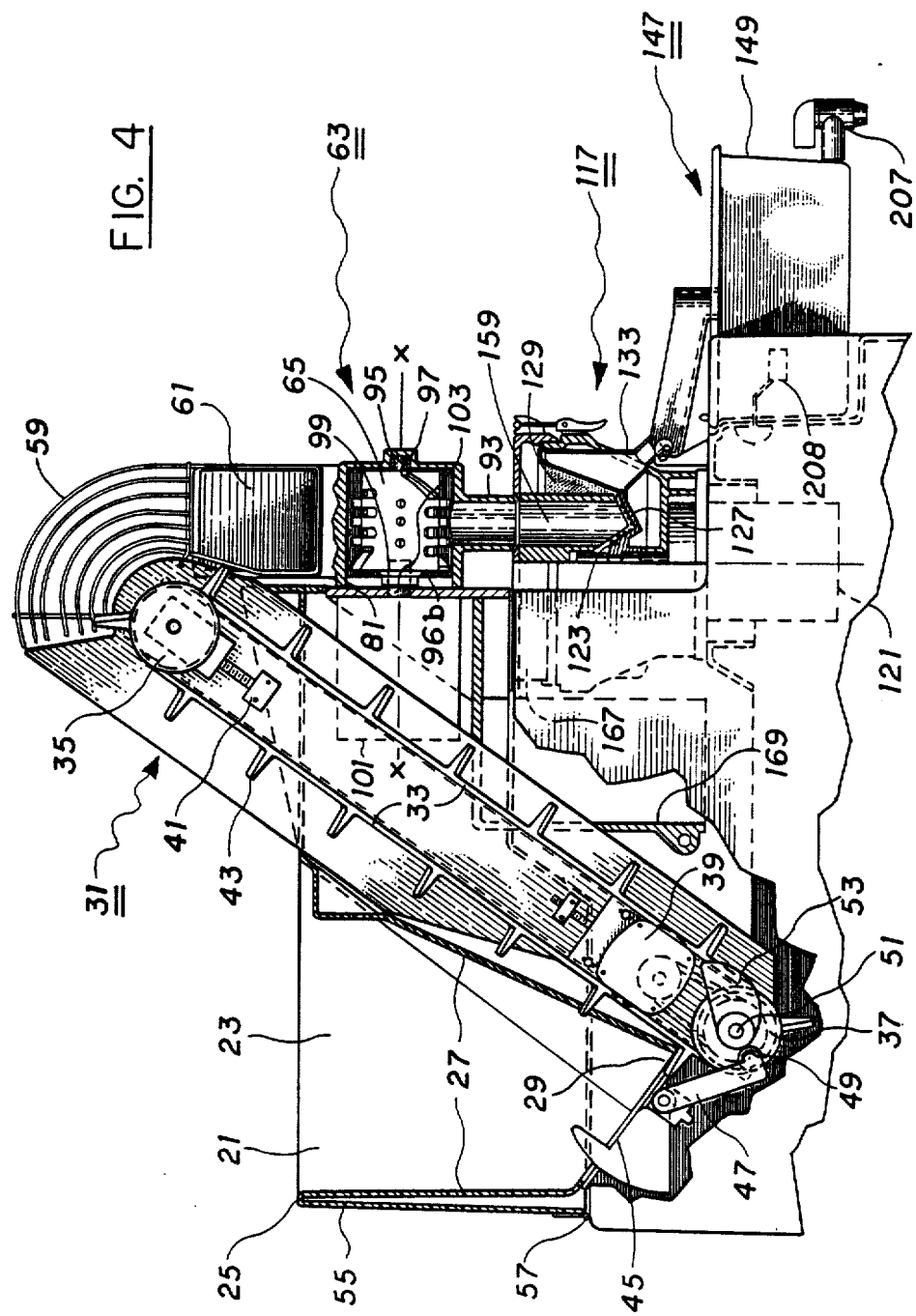
FIG. 4 is a close-up side elevational view of the upper portion of the embodiment shown in FIG. 2 with a part of the cover removed permitting a better view of the hopper, transport conveyer and loading chute.

As shown in FIGS. 2, 3 and 4, conveyor means 31 is provided in communication with hopper 21 for transporting the source material from hopper bottom opening 29 upward for gravity feeding into the next ensuing processing unit. As shown in the figures, conveyor means 31 comprises an endless conveyor belt 33 mounted between a pair of spaced-apart belt drums 35 and 37, one of which is powered by an electric motor 39 to a belt speed of about 40 inches per minute. At least one of the drums is adjustable by a bolt and fixed nut mechanism 41 to take up slack in belt 33.

As more clearly shown in FIG. 4, a series of outwardly directed projections 43 are arranged in spaced-apart relationship on conveyor belt 33 and, on their upward travel, pass along hopper bottom opening 29 so as to engage items of source material passing downward in hopper 21 for carrying upward without backward slipping along conveyor belt 33. A bumper plate 45 is pivotally mounted inside or adjacent hopper bottom opening 29 and connected to an extension arm 47 that extends outward and terminates in a journaled collar 49 attached to ride against a shaft 51 extending from electric drive motor 39.

A cam lobe 53 is connected at one end to shaft 51 so that during rotation of shaft 51 to driving conveyor belt 33, cam lobe 53 periodically pivots bumper plate 45 inward against the source material in hopper 21. This periodic motion of bumper plate 45 aids in preventing jamming of the source material in hopper 21 and insures a continuous load of source material onto conveyor belt 33. Conveyor belt 33 and hopper 21 are enclosed by a hood 55 to prevent injury. Hood 55 is pivotally mounted at the rear of machine 1 by hinge 57 so that it can be pivoted back, out of the way, for cleaning and repair of machine 1. An enclosed loading chute 59 is mounted on cabinet 3 forward of hopper 21 for receipt of source material from the end of conveyor belt 33 over and downward to a transition chute 61 for transferring source material to the cutting means.

Figure 5:
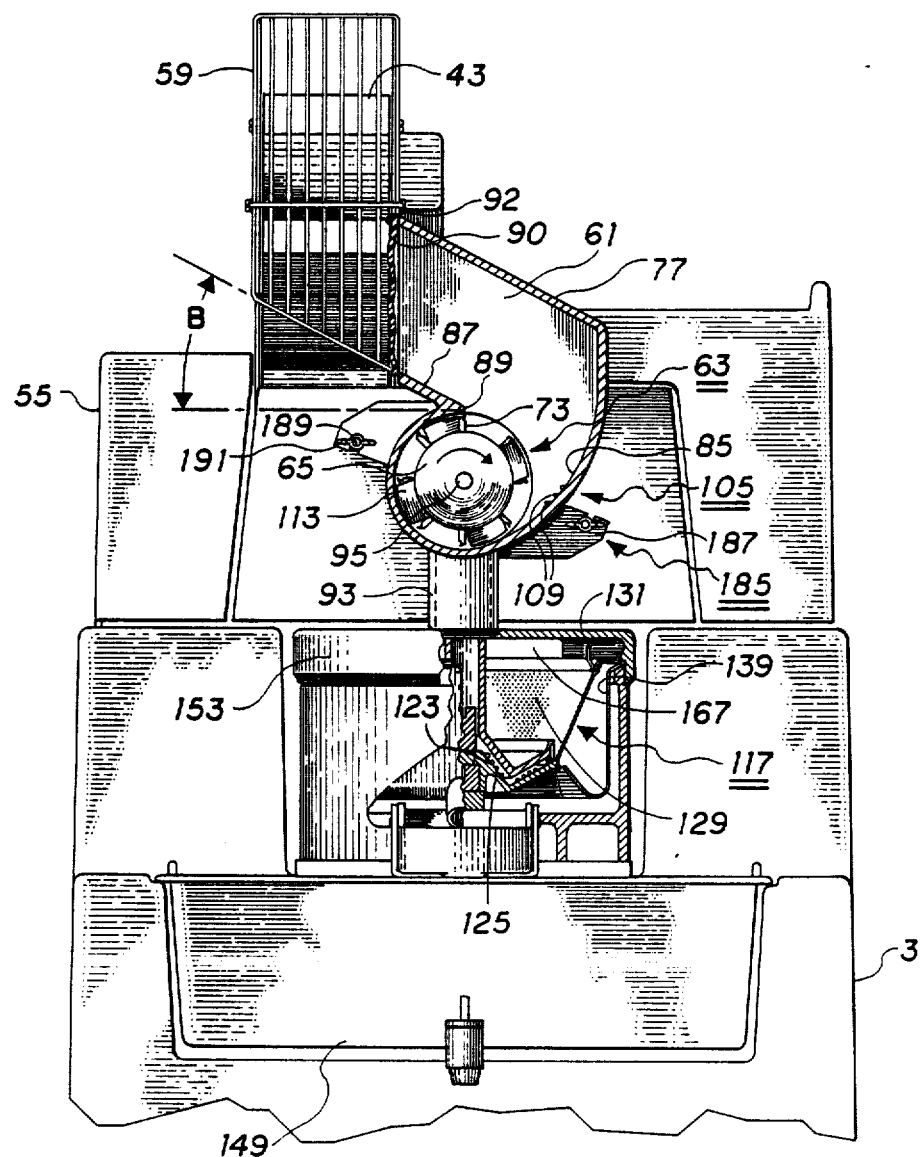
FIG. 5 is a close-up front elevational view of the upper portion of the embodiment shown in FIG. 1 showing location of some of the interior components in dotted outline.

Cutting means 63 is provided for receiving the source material from transition chute 61 for chopping and cutting the source material into small pieces. Cutting means 63 is shown in FIGS. 5, 6 and 7 to comprise a cutter drum 65 that is arranged for horizontal rotation about its central axis x—x, in a clockwise direction, at a rotational speed of about 240 rpm, as indicated by the arrows in FIGS. 5 and 7. Cutter drum 65 is defined by a cylindrical drum surface 67 terminated at spaced-apart drum ends 69a and 69b. On drum surface 67, is arranged a plurality of axial rows 71 of cutter teeth 73. Rows 71 are equally spaced-apart about outer drum surface 67 and preferably, are even in number. Cutter teeth 73 making up each row 71 are arranged in spaced-apart configuration and are of equal ultimate length so that their distal ends 75 forms a straight line above each row 71, and each tooth is of equal height above central axis x—x. The distal end 75 of each tooth 73 is formed into a wedge having an acute angle "A" where the apex 76 lies on the forward side of the tooth in the direction of tooth travel as shown in FIG. 7a. The reason for preferring an even number of rows 71 is that it is preferred the teeth in any row 71 occupy the spaces not occupied by teeth in any said adjacent row so that, during rotation of cutter drum 65, cutter teeth 73 totally define a cylindrical surface defined by the apexes 76 of their distal ends 75.

Cutter means 63 further includes a cutter drum housing 77 that is defined by a pair of spaced-apart front and rear cover walls 79 and 81 respectively, a curved-back sidewall 83, having a radius of curvature slightly greater than the radius of curvature described by cutter teeth distal ends 75 and spaced slightly apart (preferably ⅛ inch) therefrom, and a front sidewall 85 of which more will be described later.

While most cutting means in state-of-the-art cutters are loaded from the top by gravity acting on the source material such as would be coming down from overhead loading chute 59, such an arrangement often allows crushed or cut source material, as well as liberated juice, from being splashed upward into the loading chute and onto incoming source material by the spinning cutting drum. While this does not pose significant problems to a machine that is continuously charged with the same material and continuously run over a long period of time, such would allow splashing of source material and juice up into the chute such as to require extra effort and cost to keep it clean. The machine of this invention is adapted to be run using short charges of different types of source material so that it is important not to splash material from one source onto the walls of the loading chute for contact or contamination by incoming source material from a later and different source material.

Splashing or back flow of cut pieces and liberated juice is totally eliminated in this present invention by arranging transition chute 61 to intersect cutter means 63 at an acute angle "B" that is preferably tangent to outer cutter drum surface 67. As shown in FIG. 5, transition material enters housing 77 through front sidewall 85 and, by gravity, falls downward along front sidewall 85 and is swept toward cutter teeth 73 as they descend toward wall 85 thus catching between the wall and the teeth. The bottom wall 87 of transition chute 61 forms a shield above rotating cutter drum 65, stopping at point 89, to prevent cut pieces of source material and liberated juice from splashing upward into transition chute 61 and onto incoming source material. This configuration maintains cleanliness of chute 61 that has heretofore not been thought possible in the prior art. To insure the absence of splash-back, a curtain 90 may be hung from a pivot bar 92 at the entrance to transition chute 61 as shown in FIG. 5. Curtain 90 is preferably made of rubber but other flexible materials may also be used.

A discharge port 91 is formed in housing 77 directly beneath and central of cutter drum 65, including a short tube 93 extending downward therefrom, through which cut source material and liberated juice may leave cutter means 63. Front drum end 69a faces the front of cabinet 3 and contains a central boss 95, formed about axis x-x for receipt in a bearing 97 housed in front cover wall 79. As seen in FIGS. 4 and 7, a short bore 99 is formed along axis x—x in from rear drum end 69b. A cutter drive motor 101, positioned behind a rear cover wall 81 contains a short shaft 103 that extends outward into short bore 99 and is keyed or otherwise attached to cutter drum 65 for driving it in powered rotation.

First means 105 is provided in cutter means 63 for preventing the pieces of source material from rotating up out of reach of the downwardly rotating cutter teeth 73 or otherwise jamming the cutting process. As shown in FIGS. 5 and 6, first means 105 comprises a series of upwardly standing projections, preferably in the form of a plurality of lateral bars 109, positioned on, or formed in, housing front sidewall 85 just out of contact with cutter teeth distal ends 75. Bars 109 preferably have the height of about ⅛ inch and a clearance of about ⅛ inch from teeth distal ends 75 and have sharpened corners so that they catch the falling source material and restrain it from rotation against front sidewall 85 during the action of cutter teeth 73 on it. Other means for restraining the rotation of pieces of source material from rotation out of reach of cutting teeth 73 include a series of teeth or spikes and these and other configurations are fully contemplated in this invention.

Machine 1 is designed to handle various charges or loads of source material. That is to say, machine 1 will handle one pound as well as 50 pounds of source material. Accordingly, it is important that cutting means 63 be designed to handle these various loads and not allow stacking or jamming small amounts of cut source material in cutting means 63 so as to prevent that material from having its juice extracted. Accordingly, second means 111 is provided for directing the cut pieces of source material and liberated juice into a narrow exit stream from cutter means 63 for introduction into further juice extraction processes.

As shown in FIG. 7, second means 111 comprises at least one baffle tooth 113 having an oblique surface 115 formed thereon for contact with the source material and juice during the cutting operation to reflect or divert the cut material and juice toward the center of cutter drum 65. Baffle teeth 113 may be located at the end of cutter teeth rows 71 or between rows 71. Other configurations of second means 111 are possible such as fins and vanes, and they are fully contemplated in this invention.

Centrifuge means is generally shown at 117 and comprises a centrifuge bowl 119 mounted atop an electric drive motor 121 for spinning at speeds of about 3450 rpm. Bowl 119 contains a flattened, slightly upwardly pointing conical base 123, containing a series of rows of upstanding projections 125, extending outwardly to upwardly and outwardly slanting sidewalls 127, said sidewalls having formed therethrough a series of small apertures 129, said sidewalls terminating at an outwardly directed upper terminal edge 131. Surrounding bowl 119 is a shroud 133 defined by a top edge 135 forming an open top shroud area 137 and having inwardly and downwardly slanting sidewalls 139 that terminate in an inwardly formed gutter 141 at the bottom thereof. A short transfer tube 143 extends downward from an aperture 145, formed in gutter 141, into holding means 14 such as tank 149 or otherwise positioned below and outboard of centrifuge means 117 at cabinet front panel 5.

A centrifuge cover 151 is provided for enclosing the open top of centrifuge bowl 119 and comprises a flat top lid 153 having a circular outline slightly wider than upper terminal bowl edge 131, and a downwardly extending collar 155 that fits over both bowl 119 and shroud 133. A charging chute 157 is mounted under cover lid 153 and has formed therethrough a bore 159 in registration with an aperture 161 (see FIG. 3), formed in lid 153 that engages short tube 93 extending downward from cutter means discharge port 91.

Charging chute 157 includes an upwardly slanting flattened conical base 163 that is positioned over bowl projections 125 and spaced-apart therefrom by mounting bolts 165 that hold chute 157 to lid 153. Cut pieces of source material discharged from cutting means 63 through discharge tube 93 pass downward through bore 159 and charging chute 157 and are trapped between conical base 163 and bowl projections 125. These pieces of source material, lubricated by small amounts of juice liberated therefrom by cutting means 63 are further ground and pulverized into a pulp that flows by centrifugal force slowly outward between conical base 163 and spinning bowl base 123 to bowl sidewalls 127.

At sidewalls 127, the centrifugal force forces the pulp up slanted bowl sidewalls 127 and cause the juice to separate from the pulp and pass through small apertures 129 into contact with shroud 133 where it then is collected and passes by gravity downward into shroud gutter 141 and then out transfer tube 143 into holding tank 149 for later dispensing. After the juice is extracted, the pulp continues by centrifugal force upward along slanted spinning bowl sidewalls 127, steadily losing more and more juice by centrifugal force, and flows slowly toward upper bowl terminal edge 131. A cutout 167 is formed in circular centrifugal cover lid 153 and collar 155, toward the rear thereof. Outside said cutout 167 is a wall 169 positioned interior of cabinet 3 under which is positioned storage means 171 such as a plastic waste receptacle 173 set on a floor 175 built into cabinet 3. A plastic garbage bag 177 may be placed over receptacle 173 in which to catch the waste material. Receptacle 173 is accessible through a door 179 formed in front panel 5.

Figure 10:
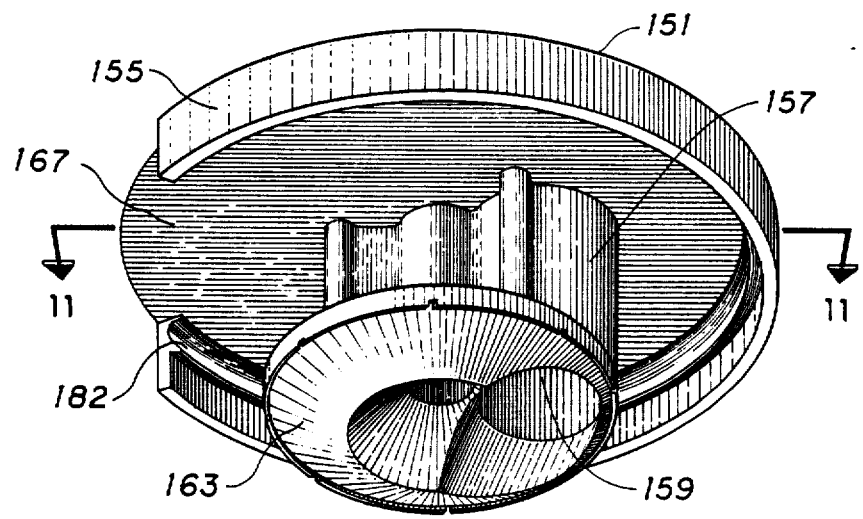
FIG. 10 is a close-up view of the centrifuge cover and charging chute, as well as the rest of the means to break up the discarded, spent material cake to achieve the continuous self-purging feature of this invention.
Figure 11:
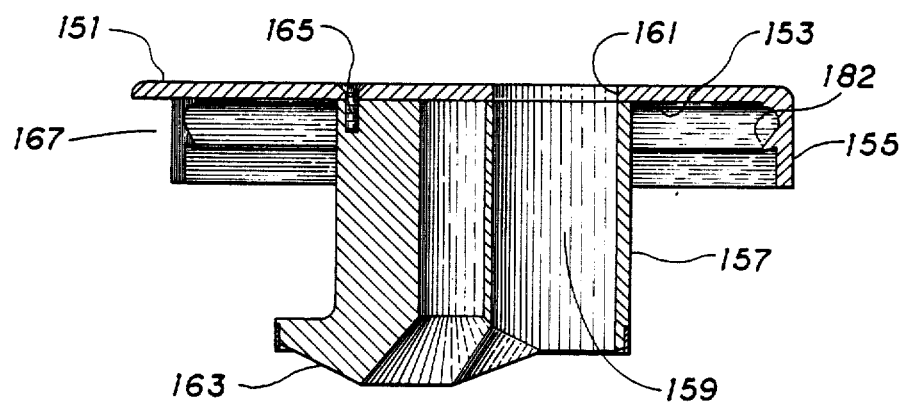
FIG. 11 is a close-up sectioned view of the embodiment shown in FIG. 10.
Figure 12:
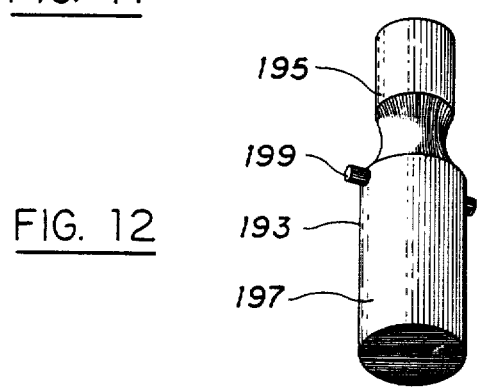
FIG. 12 is an illustrative view of a pestle usable with the machine to charge certain small amounts of material directly to the centrifuge from which the juice may be extracted.

Referring to FIGS. 10 and 11, a slanted surface 182 is formed on the inside of collar 155 of centrifugal cover lid 153 where the angle of the slant is substantially equal to the angle of slant of centrifuge bowl sidewalls 127. The stream of waste material (pulp) moving up sidewalls 127 passes into this region and later flung or thrown by centrifugal force out from top bowl edge 131 through cutout 167 against wall 169 and thereafter slides by gravity down said wall and into storage means 171.

While some source material has been found amenable to being easily discharged in a continuous stream from centrifuge spinning bowl 119, many of the source materials, including apples and pears, have been found to retain insufficient liquid, after being subjected to the centrifugal forces in spinning bowl 119, and form a buildup or cake under centrifuge lid 153. This buildup continues to the extent that it spills over top bowl edge 131 and flows into shroud 139 thereupon to be washed downward along with the juices and into holding means 147 to cloud the juices. Numerous tests were tried to somehow eliminate the buildup of waste material on the underside of centrifuge lid 153 including the use of vanes and other such devices found in the prior art. None of these devices worked satisfactorily.

Figure 8:
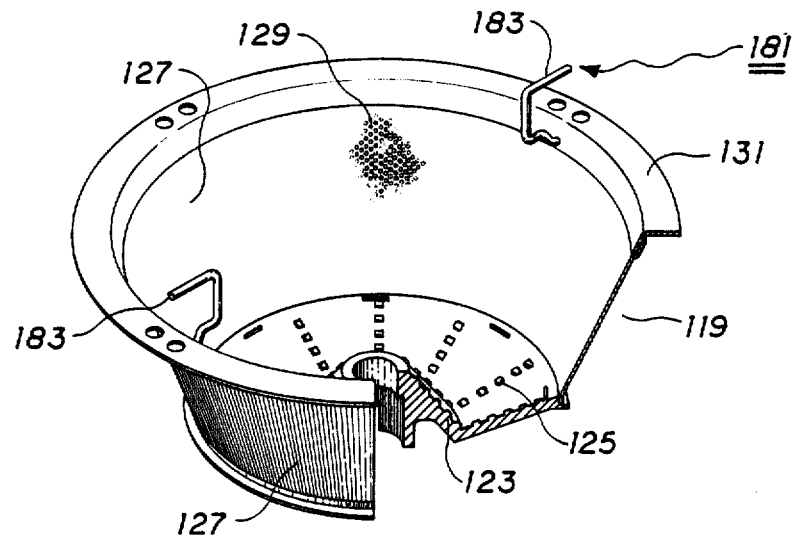
FIG. 8 is a close-up sectioned view of the bowl used in the centrifuge and a portion of the means to break up the discarded, spent material cake to insure continuous self-cleaning of the unit; and, FIG. 9 is a close-up sectioned view of the shroud surrounding the centrifuge bowl used to catch the separated juice and transfer it to the holding-serving container.
Figure 9:
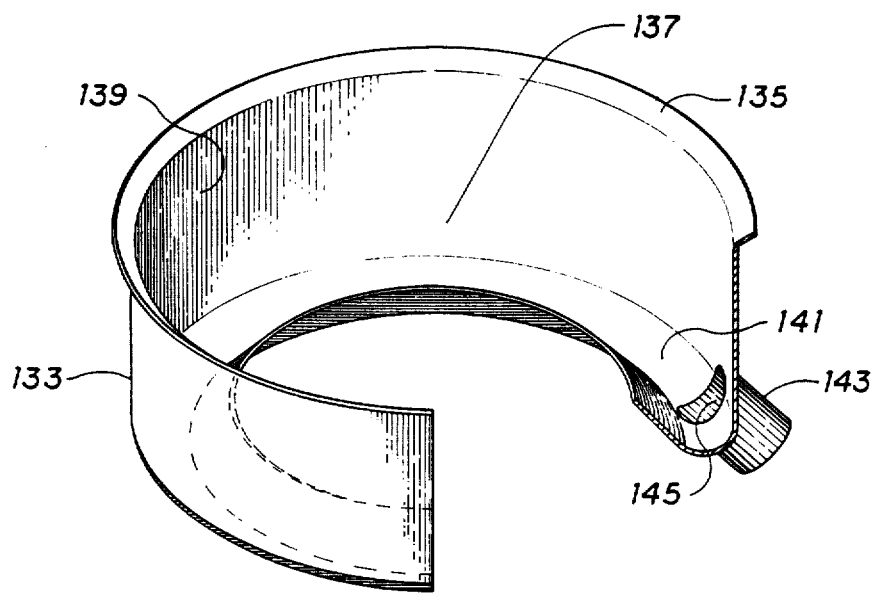

By shear serendipity, a third means 181, was discovered for insuring continuous disruption or self-purging of the cake buildup and discharge of the stream of waste material from under centrifuge lid 153 through cutout 167. As shown in FIG. 8, third means 181 comprises at least one narrow-diameter projection 183 extending above upper spinning bowl terminal edge 131 into the region under centrifugal lid 153 that is normally built up into a mass of waste material. Surprisingly, it was found that by the spinning of projection 183 with centrifuge bowl 119 the cake or buildup moved up slanted surface 182 and then was disrupted such that other waste material moving up spinning bowl sidewalls 127 would catch the disturbed material and together be flung out under centrifugal force through cutout 167 and against back wall 169. The vanes and wings of the prior art did not perform this vital function with this semi-moist material because of what appears to be the entrainment of an air pressure wave by the vane that passed into the caked build up such that the waste was forced over the upper edges of spinning bowl 119 and out against shroud 133 as aforesaid. The use of third means 181 insures the clarity of the juices by eliminating spin-out of the cake against shroud 133. While one such projection 183 will perform satisfactorily if balanced it is preferred that two or more such projections be used, in spaced-apart relationship 180° about bowl rim 131.

Another unique feature of this invention is the provision of fourth means 185 for moving cutter means 63 out of communication with centrifuge means 117 to permit direct addition of source material in through charging chute 157 into the bottom of spinning centrifuge bowl 119. This feature provides a means by which a small quantity of fruits or vegetables, for example pitted peaches or celery, can be added directly into centrifuge bowl 119 for extracting a small amount of juice on special request of a store customer. Fourth means 185 comprises mounting cutter drum housing 67 to cabinet 3 using a pair of hold down arms 187 and fastening them to machine 1 using a pair of bolts 189 and wing nuts 191 for easy removal. Upon removal of housing 77 and transition chute 61, cutter drum 65 may be withdrawn from short shaft 103 and removed from drive motor 101. Thereafter, the operator has direct access to charging chute 157. As shown in FIG. 11, a pestle 193 may be used to force small pieces of source material down through charging chute 157 for pulping and separation in spinning centrifuge bowl 119. Pestle 193 is comprised of a handle 195 and a lower pestle portion 197 extending therebelow for receipt in charging chute 157. A cross pin 199 is mounted transversely at the upper portion of pestle portion 197 near handle 195 that would contact the top rim of charging chute 157 and prevent further downward insertion of pestle 193 in chute 157 to prevent the bottom end of pestle portion 197 from coming into contact with projections 125 on the bottom of spinning centrifuge bowl 119.

Machine 1 is constructed such that the power drawn by conveyor belt drive motor 39, cutter drive motor 101 and centrifuge drive motor 121 does not exceed the maximum line current for ordinary single-phase circuits generally encountered in stores. To insure that the starting loads drawn by each of these motors do not cause the current to exceed single-phase requirements, an electric control panel 201 is provided containing controls 203 that start the three motors in a sequence as opposed to starting them simultaneously. Controls 203 include a series of relays that are timed to transit current to each of the drive motors in a specific sequence and further to prevent utilization of the machine until all three motors have come up to speed. A series of interlocks 205 are provided in various areas of machine 1 to insure that no electrical power is provided to any of the motors while any of the components, other than those removed by fourth means 185, are in place, covered, and locked for safe use. Interlocks 205 generally comprise magnetic reed switches mounted on one side of an interface between a component and machine 1 or cabinet 3 and a magnet on the other side of the interface and arranged such that the magnetic read switch will not close a circuit until the other component containing the magnet is placed in proper proximity thereto.

At the front of holding means 147 is a spigot 207 or other dispensing means for use by store personnel or customers to fill various containers with the separated juice. A float mechanism and switch 208 is provided near holding tank 149 to shut off machine 1 when the level of juice therein reaches a predetermined level. Machine 1 is started into operation by pressing start switch 204.

What is claimed is:

1. A portable, automatic juice-extraction machine, comprising:
   (a) a cabinet defined by spaced-apart front and rear panels joined along their respective edges by spaced-apart side panels, said cabinet mounted on wheels for movement across a floor;
   (b) hopper means supported on said cabinet having an open top at or below eye-level for receipt of the juice source material therein;
   (c) conveying means in communication with said hopper;
   (d) cutting means for receiving said source material from said conveying means and chopping it into small pieces, without allowing the chopped pieces or juice liberated therefrom to back flow into said conveying means, including first means for preventing pieces of source material from rotating up out of reach of said cutting means;
   (e) centrifuge means in communication with said cutting means for further reducing the chopped pieces of source material to a pulp and subjecting said pulp to centrifugal forces to separate it into a stream of juice and a separate stream of waste material;
   (f) holding means mounted adjacent said front panel of said cabinet at a convenient level above the floor for receiving the extracted juice for bottling or selective serving to customers;
   (g) storage means inside said cabinet for receiving and storing the waste material; and,
   (h) power means, including means for connection to a power source, for driving said conveying means, said cutting means and said centrifuge means.

2. The portable, automatic juice extraction machine of claim 1 further including second means for directing the cut pieces of source material into a narrow exit stream from said cutter means for introduction to the center of said centrifuge means.

3. The portable, automatic juice extraction machine of claim 1 further including third means for insuring continuous discharge of the stream of waste material from said centrifuge means.

4. The portable, automatic juice extraction machine of claim 1 further including fourth means for removing said cutter means out of communication with said centrifuge means to allow source material to be introduced directly into said centrifuge means from the front of said machine.

5. The portable, automatic juice extraction machine of claim 4 further including pestle means for pushing the source material directly into contact with said centrifuge means.

6. The portable, automatic juice extraction machine of claim 1 wherein said conveying means includes a driven endless conveyor belt in association with spaced-apart drums for conveying the source material from said hopper means to said cutter means and including a bumper plate pivotally arranged to periodically jostle the source material into continuous movement through said hopper.

7. The portable, automatic juice extraction machine of claim 1 wherein said conveying means is arranged to be loaded with source material from the bottom of said hopper means to convey said material upward to a loading chute for gravity feeding into said cutting means.

8. The portable, automatic juice extraction machine of claim 1 wherein said conveying means includes an endless conveyor belt mounted between a pair of spaced-apart cylindrical belt drums, one of which is powered by an electric motor, said belt containing a series of outwardly-directed projections, arranged in spaced-apart relationship thereon and further including means for adjusting the distance between said belt drums.

9. The portable, automatic juice extraction machine of claim 1 further including a cover pivotally mounted on said machine to enclose portions of said hopper means and said conveying means during operation of said machine.

10. The portable, automatic juice extraction machine of claim 1 wherein said cutting means includes a cutter drum arranged for horizontal powered rotation about a central axis in a housing for feeding source material into the side and discharge from below including a plurality of axial rows of cutter teeth spaced apart therealong wherein said teeth making up each said row occupy the spaces not occupied by teeth in any adjacent row and further wherein said cutter assembly comprises an offset transition chute for feeding said source into tangential contact with said cutting assembly and said cutter drum, and wherein the distal ends of said teeth are formed into a wedge having an acute angle wherein the apex of said angle lies on the forward side of said tooth in the direction of tooth travel.

11. The portable, automatic juice extraction machine of claim 1 wherein said first means for preventing the source from rotating up out of reach of said cutting means includes a series of lateral projections formed in said cutting means, spaced apart from said cutter, and laterally spaced above said cutter for contact with said material source prior to and during cutting thereof.

12. The portable, automatic juice extraction machine of claim 11 wherein said series of lateral projections include a plurality of horizontal bars having sharp corners, spaced apart from said teeth on the inner wall of said housing.

13. The portable, automatic juice extraction machine of claim 10 wherein said cutter teeth are of equal length so that their distal ends trace a common cylindrical surface during rotation of said cutter drum.

14. The portable, automatic juice extraction machine of claim 10 wherein said second means for directing the cut pieces of source material and liberated juice into a narrow, constant exit stream for introduction into said centrifuge means includes at least one baffle tooth mounted at each end of said cutter drum each containing an oblique surface for contact with the cut pieces of source material and juice at a cutting drum rotation speed such as to deflect said pieces and juice toward the center of said cutting drum.

15. The portable, automatic juice extraction machine of claim 3 wherein said third means for causing continuous discharge of the extracted cuttings from said centrifuge means includes at least one short, stiff member of narrow diameter extending above said centrifuge means into an area bounded by a surface at the same slant as that of the centrifuge means into the area in which pulped source material tends to build up for disrupting the buildup of said cut material to allow the centrifugal force developed by said centrifuge means to discharge said disrupted pulp from said centrifuge means.

16. The portable, automatic juice extraction machine of claim 1 wherein said holding means includes a holding tank in communication with said centrifuge means for receipt of extracted juice from said source and a spigot including a valve for operation by a user to selectively discharge the extracted juice from said tank into a suitable receptacle.

17. The portable, automatic juice extraction machine of claim 1 wherein said cutting means comprises:
 (a) a cutter drum arranged for horizontal powered axial rotation and containing a plurality of spaced-apart rows of spaced-apart cutter teeth extending outward from the surface thereof, each said tooth of equal height from said axis of rotation and spaced about said drum, the teeth in any said row occupying spaces not occupied by the teeth in any adjacent row; and,
 (b) a housing comprising:
  (i) a pair of spaced-apart front and rear cover walls between which said cutter drum is arranged to rotate;
  (ii) a curved back sidewall having a radius of curvature of said cutter teeth, and spaced slightly apart from the distal ends thereof;
  (iii) a front sidewall transitioning from said communication means toward and converging with the lower-most portion of said curved front sidewall at an acute angle whereby the source material introduced through said conveying means passes by gravity into contact with said cutter teeth of said cutter drum and is chopped by said teeth when forced into contact therewith; and,
  (iv) a discharge port formed in said housing below said cutter drum and midway between said sidewalls for the cut pieces of source material and liberated juice to pass into said centrifuge means.

18. The portable, automatic juice extraction machine of claim 17 wherein said conveying means includes an enclosed loading chute and a transition chute extending into communication with said cutter housing at an angle tangent to said cutter drum surface and spaced above said housing so that the rotation of said cutter drum, in the direction of said tangent angle, propels cut source material and juice liberated from said material away from said chute to prevent back flow of cut pieces and juice onto incoming material and onto said chute.

19. The portable, automatic juice extraction machine of claim 1 wherein said cabinet is enclosed and includes a door for access to the inside thereof and a floor therein, above said wheels, for receipt thereon of said storage means.

20. The portable, automatic juice extraction machine of claim 1 wherein said conveying means transports said source material from said lower portion of said hopper upward for gravity feed to said cutting means.

21. The portable, automatic juice extraction machine of claim 1 wherein said power means includes an electric control panel including controls for starting said driving means for said conveying means, said cutting means and said centrifuge means in sequence so as to prevent the start up current from exceeding the maximum line current for single-phase operation.

* * * * *